T. T. RAMEY.
QUICK EMPTYING FUNNEL.
APPLICATION FILED OCT. 4, 1915.
1,265,381. Patented May 7, 1918.
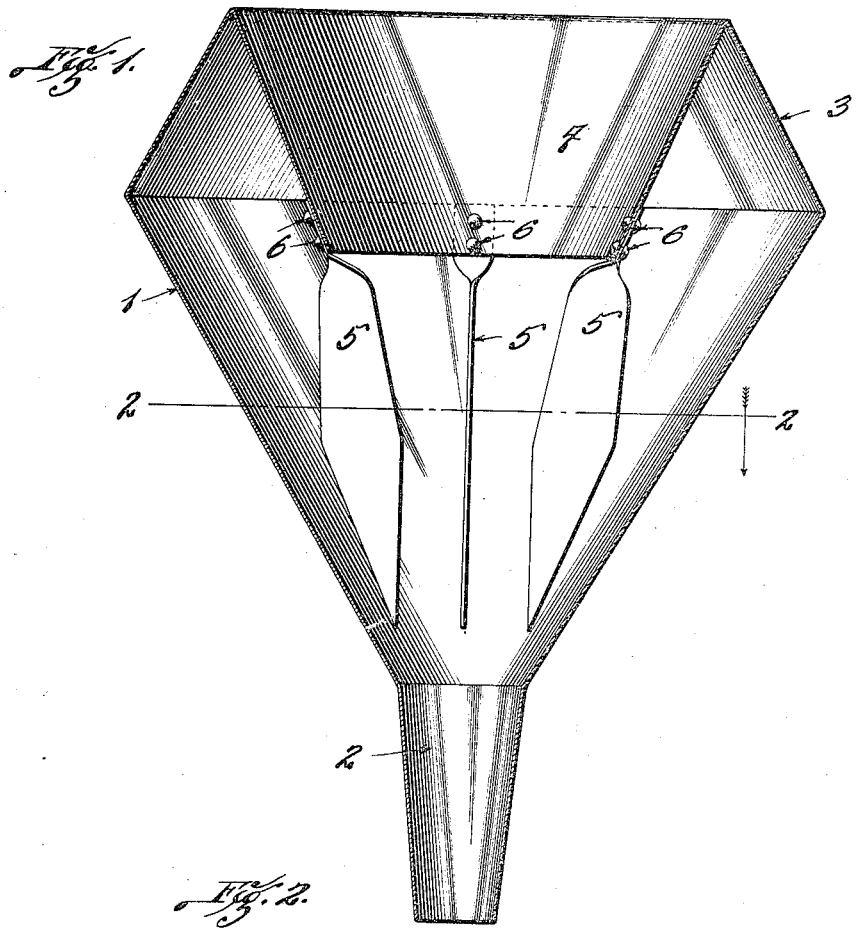
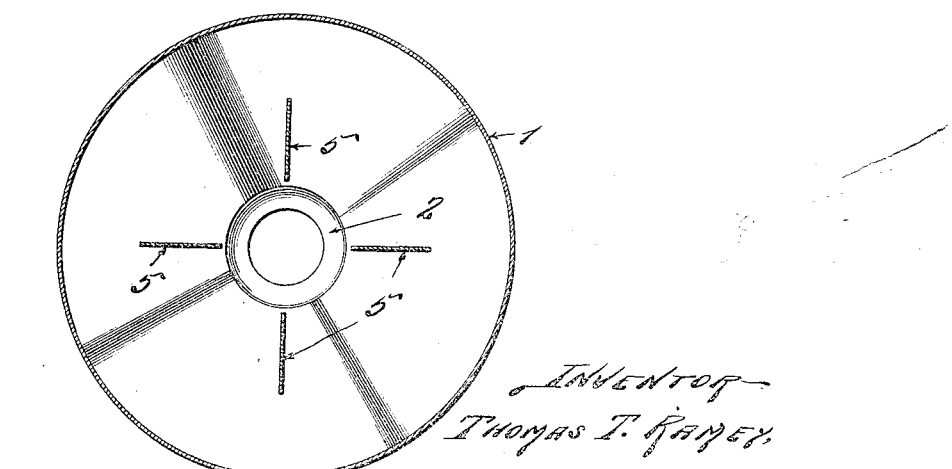

UNITED STATES PATENT OFFICE.

THOMAS T. RAMEY, OF EDWARDSVILLE, ILLINOIS.

QUICK-EMPTYING FUNNEL.

1,265,381.

Specification of Letters Patent.

Patented May 7, 1918.

Application filed October 4, 1915. Serial No. 53,943.

*To all whom it may concern:*

Be it known that I, THOMAS T. RAMEY, citizen of the Untied States, and resident of Edwardsville, Illinois, have invented certain new and useful Improvements in Quick-Emptying Funnels, of which the following is a specification containing a full, clear, and exact description, reference being had to the accompanying drawings, forming a part hereof.

My invention relates to improvement in quick emptying funnels, and consists in the novel arrangement and construction of parts hereinafter described and specifically designated in the appended claim.

The object of my invention is to provide an improved funnel which shall discharge more quickly the liquids poured into it than will funnels of the prior art heretofore known to me.

In the drawings,

Figure 1 is a vertical section of a funnel embodying my invention, and

Fig. 2 is a horizontal section of same taken on a line 2—2 of Fig. 1.

Referring to the drawings by numerals, 1 indicates the usual body of the funnel, and 2 the spout or spigot thereof.

Located at the upper end of the body 1, is an inverted annular air-chamber 3, the walls of which are V-shaped in cross section.

The inner wall 4 of said air-chamber 3 is itself in the form of a small funnel, into which the liquid is poured, and from which the liquid drops into the main body 1. The lower end of said inner funnel extends a distance upon the interior of the said body 1 below the line of the upper end of said body 1.

Within the said body 1 and arranged radially, are series of wings or guide ribs 5, the upper ends of which are secured to the depending lower portion of said inner funnel 4 by means of rivets 6. The lower ends of said guide ribs 5 are preferably pointed or tapered as shown and hang free, separated a distance from each other and from the wall of said body 1.

The operation is as follows: When liquid is poured rapidly into my improved funnel, it passes directly through same and quickly makes its exit through the spout 2.

The said guide ribs 5 prevent the usual whirlpool or eddy within the funnel and guide the liquid directly through same thereby causing the funnel to be much quicker in its action than is the ordinary funnel, devoid of guide ribs.

The function and advantages of the said air-chamber 3 are, so far as I am informed, as follows:

The smaller funnel 4, being the inner wall of the said air-chamber, and being located at it is directly above the discharge 2, concentrates and holds the liquid directly over the point of discharge, and directs it downwardly and centrally toward said discharge, and thereby aids in the quick-emptying action of the entire funnel; and, furthermore, the said smaller funnel's lesser diameter confines a considerable body of liquid during its downward movement toward said discharge, and thus reduces the surface friction and pressure of the liquid which is in contact with the walls of the main funnel, or body 1. Furthermore the said inner funnel 4 when completely filled as it is when the discharge is rapid, forces the liquid rapidly into and through the body 1.

For some reason unknown to me, and which I am advised the law does not require me to explain, the air within the said air-chamber 3 acts to assist the rapid discharge of the liquid through the main body of my funnel.

The said air-chamber 3 is open upon its underside, so that the liquid may rise thereinto a slight distance during use of the funnel; but the further entrance of liquid into the air-chamber is limited and prevented by the air therein contained, which acts as a partition, to obstruct the further entrance of the iquid, almost the same is if a solid wall or partition were extended from the lower portion of the inner funnel 4 to the wall of the outer funnel body 1; with the difference, of course, that the air in said air-chamber acts as a movable partition, owing to the well-known inherent compressible character of the air.

It is possible that the flow is increased by the sudden enlargement of the cross-section at the top of the blades 5, and by the gradual contraction below that point. If the increased flow is due to such a structure the air-chamber (as such) may not be the cause, and possibly the same result would be obtained if the air-chamber were partitioned off by a plate extending horizontally from the lower end of said inner funnel to the wall of the outer funnel.

What I claim is:

An improved funnel, comprising a main funnel having a suitable delivery device at its lower end; a funnel of less diameter located within said main funnel and united to the upper end of the latter, and forming the inner wall of an air chamber at the upper end of said main funnel, whereby the rise of the liquid from said main funnel into said air-chamber is obstructed; in combination with means for preventing the eddying of the liquid contained in said main funnel at the point of sudden enlargement of the liquid passage at the lower end of said inner funnel.

In testimony whereof, I have signed my name to this specification, in presence of two subscribing witnesses.

THOMAS T. RAMEY.

Witnesses:
E. L. WALLACE,
JOHN C. HIGDON.

Copies of this patent may be obtained for five cents each, by addressing the "Commissioner of Patents, Washington, D. C."